United States Patent
Waugh

(10) Patent No.: US 10,030,798 B2
(45) Date of Patent: Jul. 24, 2018

(54) BULKHEAD FITTING

(71) Applicant: The Boeing Company, Chicago, IL (US)

(72) Inventor: Gregory M. Waugh, Renton, WA (US)

(73) Assignee: The Boeing Company, Chicago, IL (US)

( * ) Notice: Subject to any disclaimer, the term of this patent is extended or adjusted under 35 U.S.C. 154(b) by 1049 days.

(21) Appl. No.: 13/769,705

(22) Filed: Feb. 18, 2013

(65) Prior Publication Data
US 2014/0232103 A1 Aug. 21, 2014

(51) Int. Cl.
| F16L 27/10 | (2006.01) |
| F16L 25/02 | (2006.01) |
| B64D 37/32 | (2006.01) |
| B64D 45/02 | (2006.01) |
| F16L 5/12  | (2006.01) |

(52) U.S. Cl.
CPC .............. *F16L 25/02* (2013.01); *B64D 37/32* (2013.01); *B64D 45/02* (2013.01); *F16L 5/12* (2013.01); *F16L 25/026* (2013.01)

(58) Field of Classification Search
USPC ..................... 285/64, 48, 205, 223
See application file for complete search history.

(56) References Cited

U.S. PATENT DOCUMENTS

| 4,823,527 | A * | 4/1989 | Harbeke ........................ 52/220.8 |
| 6,634,676 | B1 * | 10/2003 | Lampson et al. ........ 285/123.15 |
| 7,681,923 | B2 | 3/2010 | Negley et al. |
| 2006/0099843 | A1 | 5/2006 | Fullner et al. |
| 2007/0145190 | A1 | 6/2007 | Villegas et al. |
| 2008/0078864 | A1 | 4/2008 | Wilkerson et al. |
| 2010/0001512 | A1 | 1/2010 | Breay et al. |
| 2010/0003840 | A1 | 1/2010 | Breay et al. |

FOREIGN PATENT DOCUMENTS

| EP | 2034228 A1 | 3/2009 |
| JP | 2007505468 A | 3/2007 |

OTHER PUBLICATIONS

International Search Report and Written Opinion, dated Apr. 23, 2014, regarding Application No. PCT/US2014/010414, 13 pages.
"Airworthiness Standards: Transport Category Airplanes," Code of Federal Regulations, Federal Aviation Administration, Sec. 25.981, Sep. 2008, 2 pages, accessed Feb. 18, 2013, http://www.airweb.faa.gov/Regulatory_and_Guidance_Library%5CrgFAR.nsf/0/339DAEE3E0A6379D862574CF00641951?OpenDocument.
"Aircraft Lightning Test Methods," Aerospace Recommended Practice, SAE Aerospace, SAE ARP5416A, Jan. 2013, 105 pages.

(Continued)

*Primary Examiner* — Aaron M Dunwoody
(74) *Attorney, Agent, or Firm* — Yee & Associates, P.C.

(57) ABSTRACT

A method and apparatus for electrically separating two fluid lines across a structural boundary. Fluid is transported between a first channel through a first fluid line and a second channel through a second fluid line across the structural boundary formed by a structure. The first channel and the second channel are connected by a channel formed by a fitting. The fitting is comprised of a first component, a second component, and an isolator. The first fluid line and the second fluid line are electrically separated using the isolator in the fitting.

17 Claims, 7 Drawing Sheets

(56) References Cited

OTHER PUBLICATIONS

International Preliminary Report on Patentability, dated Aug. 18, 2015, regarding Application No. PCT/US2014/010414, 9 pages.
State Intellectual Property Office of the Peoples Republic of China Notification of the Second Office Action and partial English Translation, regarding Application No. 2014800093748, dated Nov. 2, 2016, 9 pages.
European Patent Office Communication, dated Nov. 16, 2016, regarding Application No. EP14703186.8, 6 pages.
State Intellectual Property Office of the PRC Notification of Third Office Action, dated Mar. 13, 2017, regarding Application No. 2014800093748, 26 pages.
State Intellectual Property Office of the Peoples Republic of China Notification of the First Office Action regarding Application No. 2014800093748, dated Jun. 2, 2016, 14 pages.
European Patent Office Communication, dated May 18, 2017, regarding Application No. 14703186.8, 7 pages.
Japanese Patent Office Notice of Reasons for Rejection, dated Dec. 12, 2017, regarding Application No. 2015-558004, 13 pages.
European Patent Office Examination Report, dated Dec. 20, 2017, regarding Application No. 14703186.8, 6 pages.

\* cited by examiner

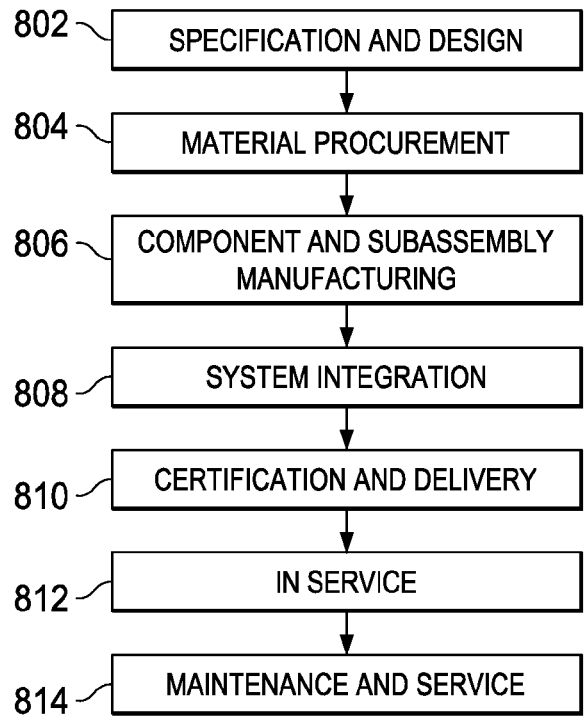
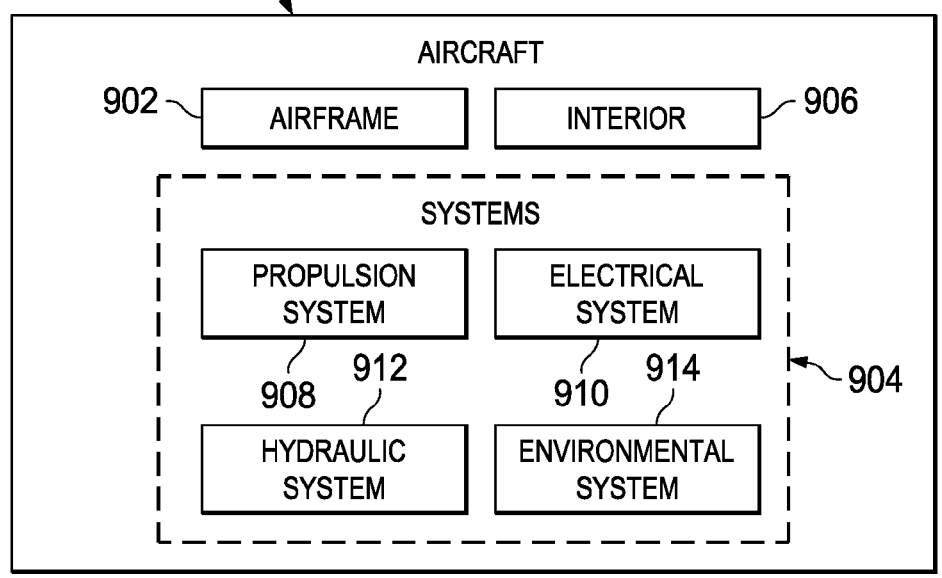

BULKHEAD FITTING

BACKGROUND INFORMATION

1. Field

The present disclosure relates generally to fittings and, in particular, to bulkhead fittings. Still more particularly, the present disclosure relates to a bulkhead fitting capable of providing an electrically isolated pathway for transporting fluid across a structural boundary within an aerial platform.

2. Background

Fluid transport systems are typically comprised of fluid lines connected to each other. These fluid lines carry fluid that may be comprised of any number of liquids and/or gases. Fluid transport systems may be used to transport fluids, including, but not limited to, fuel, hydraulic fluid, and/or other types of fluids, within platforms such as aircraft and spacecraft. An aircraft fuel system is one example of a fluid transport system. An aircraft fuel system transports fuel from a fuel storage tank to various locations within an aircraft.

In certain situations, fluid may need to be carried across a structural boundary. The structural boundary may be, for example, a bulkhead. As used herein, a "bulkhead" is a structural partition that may take the form of, for example, a wall or a panel. A bulkhead may be a partition that separates a first area and a second area. In one example, a fluid line is passed through the structural boundary. The fluid line may carry fluid from a first area to a second area across the structural boundary.

In another example, a first fluid line may be connected to a bulkhead fitting at a first side of the bulkhead, while a second fluid line may be connected to the bulkhead fitting at a second side of the bulkhead. The bulkhead fitting provides a connection between the first fluid line and the second fluid line to allow fluid to flow between these two fluid lines across the structural boundary.

In certain situations, electrostatic charge may build up on the one or more fluid lines transporting fluid across a structural boundary. With some currently available fluid transport systems, these fluid lines may transfer this electrostatic charge between the two areas separated by the bulkhead. In some cases, this transfer of electrostatic charge may have undesired effects.

Further, in some cases, an electromagnetic event may cause electrical current to flow along fluid lines. With some currently available fluid transport systems, the electrical current may flow across the structural boundary formed by a bulkhead. In some cases, the electrical current may flow across a structural boundary into an area in which the flow of electrical current should be prevented. Therefore, it would be desirable to have a method and apparatus that take into account at least some of the issues discussed above, as well as possibly other issues.

SUMMARY

In one illustrative embodiment, an apparatus comprises a first component, a second component, and an isolator. The first component is attached to a first fluid line and a first side of a structure. The second component is attached to a second fluid line and a second side of the structure. The isolator is located between the first component and the second component within an opening in the structure. The first component, the second component, and the isolator form a channel that connects a first channel through the first fluid line to a second channel in the second fluid line. The isolator electrically separates the first fluid line and the second fluid line.

In another illustrative embodiment, a bulkhead fitting comprises a first component, a second component, and an isolator. The first component is attached to a first fluid line and a first side of a bulkhead. The second component is attached to a second fluid line and a second side of the bulkhead. The isolator is located between the first component and the second component within an opening in the bulkhead. The first component, the second component, and the isolator form a channel that connects a first channel through the first fluid line to a second channel in the second fluid line. The isolator electrically separates the first fluid line and the second fluid line by at least one of reducing a flow of electrical current between the first fluid line and the second fluid line to within selected tolerances and reducing a transfer of electrostatic charge between the first fluid line and the second fluid line to within selected tolerances.

In yet another illustrative embodiment, a method for electrically separating two fluid lines across a structural boundary is provided. Fluid is transported between a first channel through a first fluid line and a second channel through a second fluid line across the structural boundary formed by a structure. The first channel and the second channel are connected by a channel formed by a fitting. The fitting is comprised of a first component, a second component, and an isolator. The first fluid line and the second fluid line are electrically separated using the isolator in the fitting.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of an aircraft manufacturing and service method in the form of a flowchart in accordance with an illustrative embodiment; and FIG. 9 is an illustration of an aircraft in the form of a block diagram in accordance with an illustrative embodiment.

DETAILED DESCRIPTION

The illustrative embodiments recognize and take into account that it may be desirable to have a bulkhead fitting capable of electrically separating a first fluid line and a second fluid line such that the flow of electrical current between these two fluid lines is reduced to within selected tolerances. Further, the illustrative embodiments recognize and take into account that it may be desirable to have a bulkhead fitting capable of electrically separating a first fluid line and a second fluid line such that the transfer of electrostatic charge between these two fluid lines is reduced to within selected tolerances. Thus, the illustrative embodiments provide an apparatus and method for electrically separating two fluid lines across a structural boundary formed by, for example, a bulkhead.

Figure 1:
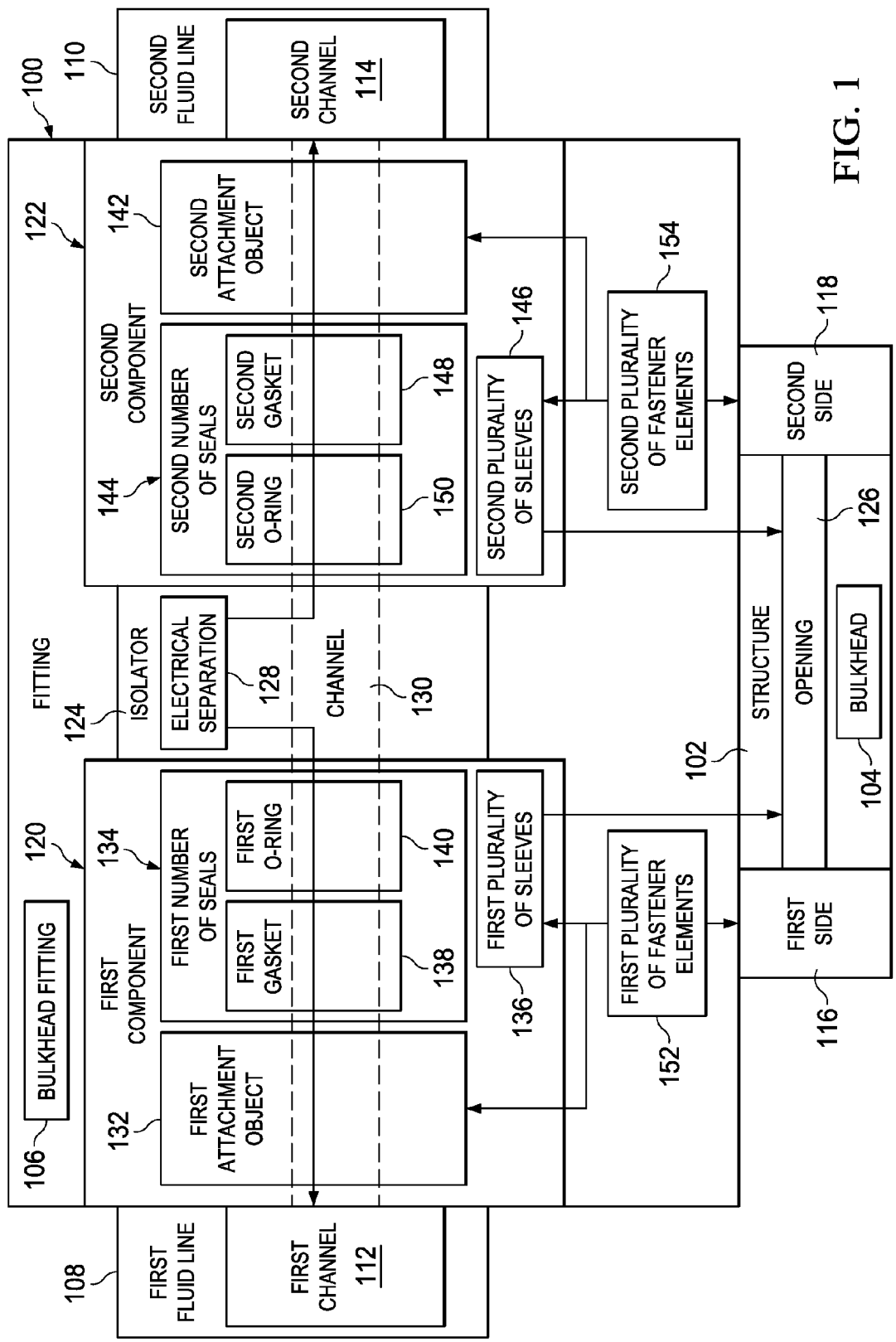
FIG. 1 is an illustration of a fitting in the form of a block diagram in accordance with an illustrative embodiment.

Referring now to the figures and, in particular, with reference to FIG. 1, an illustration of a fitting is depicted in the form of a block diagram in accordance with an illustrative embodiment. As depicted, fitting 100 may be used with structure 102. Structure 102 may be any type of structure that forms a structural boundary. In one illustrative example, structure 102 takes the form of bulkhead 104. When structure 102 takes the form of bulkhead 104, fitting 100 may be referred to as bulkhead fitting 106.

Fitting 100 may be used to connect first fluid line 108 to second fluid line 110 across the structural boundary formed by structure 102. First fluid line 108 has first channel 112 for transporting fluid. Second fluid line 108 has second channel 114 for transporting fluid. The fluid transported by first fluid line 108 and second fluid line 110 may be comprised of any number of liquids and/or gases. The fluid may be, for example, fuel, hydraulic fluid, or some other type of fluid. When the fluid is fuel, first fluid line 108 and second fluid line 110 may be referred to as a first fuel line and a second fuel line, respectively.

In particular, fitting 100 connects first fluid line 108 to first side 116 of structure 102 and second fluid line 110 to second side 118 of structure 102. As depicted, fitting 100 is formed by first component 120, second component 122, and isolator 124. First component 120 attaches to first fluid line 108 and to first side 116 of structure 102. Second component 122 attaches to second fluid line 110 and to second side 118 of structure 102.

Isolator 124 may be located within opening 126 in structure 102 between first component 120 and second component 122. For example, opening 126 may be a hole that extends from first side 116 of structure 102 to second side 118 of structure 102. Isolator 124 may be located within opening 126.

In this illustrative example, isolator 124 provides electrical separation 128 between first fluid line 108 and second fluid line 110. Isolator 124 may be configured to electrically separate first fluid line 108 and second fluid line 110 to reduce a flow of electrical current between first fluid line 108 and second fluid line 110 to within selected tolerances. Further, isolator 124 may be configured to electrically separate first fluid line 108 and second fluid line 110 to reduce a transfer of electrostatic charge between first fluid line 108 and second fluid line 110 to within selected tolerances.

As depicted, first component 120, second component 122, and isolator 124 form channel 130. Channel 130 extends from first side 116 of structure 102 to second side 118 of structure 102. Channel 130 connects first channel 112 through first fluid line 108 to second channel 116 through second fluid line 110. In other words, channel 130 allows the fluid transported by first fluid line 108 to flow across the structural boundary formed by structure 102 to second fluid line 110. Similarly, channel 130 allows the fluid transported by second fluid line 110 to flow across the structural boundary formed by structure 102 to first fluid line 108.

In one illustrative example, first component 120 is formed by first attachment object 132, first number of seals 134, and first plurality of sleeves 136. First number of seals 134 is configured to seal a first interface between first attachment object 132 and isolator 124. First number of seals 134 may include a gasket, a ring, an o-ring, a plastic seal, a flanged gasket, and/or some other type of seal. In one illustrative example, first number of seals 134 includes first gasket 138 and first o-ring 140.

In a similar manner, second component 122 is formed by second attachment object 142, second number of seals 144, and second plurality of sleeves 146. Second number of seals 144 is configured to seal a second interface between second attachment object 142 and isolator 124. Second number of seals 144 may include a gasket, a ring, an o-ring, a plastic seal, a flanged gasket, and/or some other type of seal. In one illustrative example, second number of seals 144 includes second gasket 148 and second o-ring 150.

First plurality of fastener elements 152 may be used to attach first attachment object 132 to structure 102. For example, first attachment object 132 may have first flanges with first openings. Further, first plurality of sleeves 136 may be positioned within opening 126 in structure 102. First plurality of fastener elements 152 may be inserted through these first openings at first side 116 of structure 102 and into first plurality of sleeves 136 located within opening 126 in structure 102.

In a similar manner, second plurality of fastener elements 154 may be used to attach second attachment object 142 to structure 102. For example, second attachment object 142 may have second flanges with second openings. Further, second plurality of sleeves 146 may be positioned within opening 126 in structure 102. Second plurality of fastener elements 154 may be inserted through these second openings at second side 118 of structure 102 and into second plurality of sleeves 146 located within opening 126 in structure 102. First plurality of sleeves 136 and second plurality of sleeves 146 may be comprised of a material having an electrical resistance within a selected range sufficiently high to reduce the flow of electrical current across structure 102.

Further, isolator 124 may also be comprised of a material having a number of electrical properties within a selected range. These one or more electrical properties may include electrical resistance, electrical resistivity, and/or electrical conductivity. For example, isolator 124 may have an electrical resistance sufficiently high to reduce the flow of electrical current and/or the transfer of electrostatic charge across the structural boundary formed by structure 102.

Additionally, isolator 124 may have a length sufficient to provide electrical separation 128 between first fluid line 108 and second fluid line 110. The length of the channel formed by isolator 124 may be increased while the overall length of isolator 124 is decreased by changing the shape of isolator 124. For example, isolator 124 may have a cylindrical shape, a wavy shape, a curved shape, or some other type of shape.

In this illustrative example, structure 102 may be located within one of an aerial platform, a space platform, and an aerospace platform. The aerial platform may be, for example, without limitation, an aircraft, an unmanned aerial vehicle, a helicopter, or some other type of aerial vehicle or platform. The space platform may be, for example, without limitation, a spacecraft, a space shuttle, a satellite station, a space station, or some other type of space vehicle or platform. The aerospace platform may be, for example, without limitation, a space shuttle, a two-stage hypersonic vehicle, a two-stage launch vehicle, or some other type of vehicle capable of traveling through both air and space.

The illustration of fitting 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, fitting 100 may not include one or both of first plurality of sleeves 136 and second plurality of sleeves 146. In some illustrative examples, opening 126 through structure 102 may be a discontinuous opening formed by multiple openings through structure 102.

Figure 2:
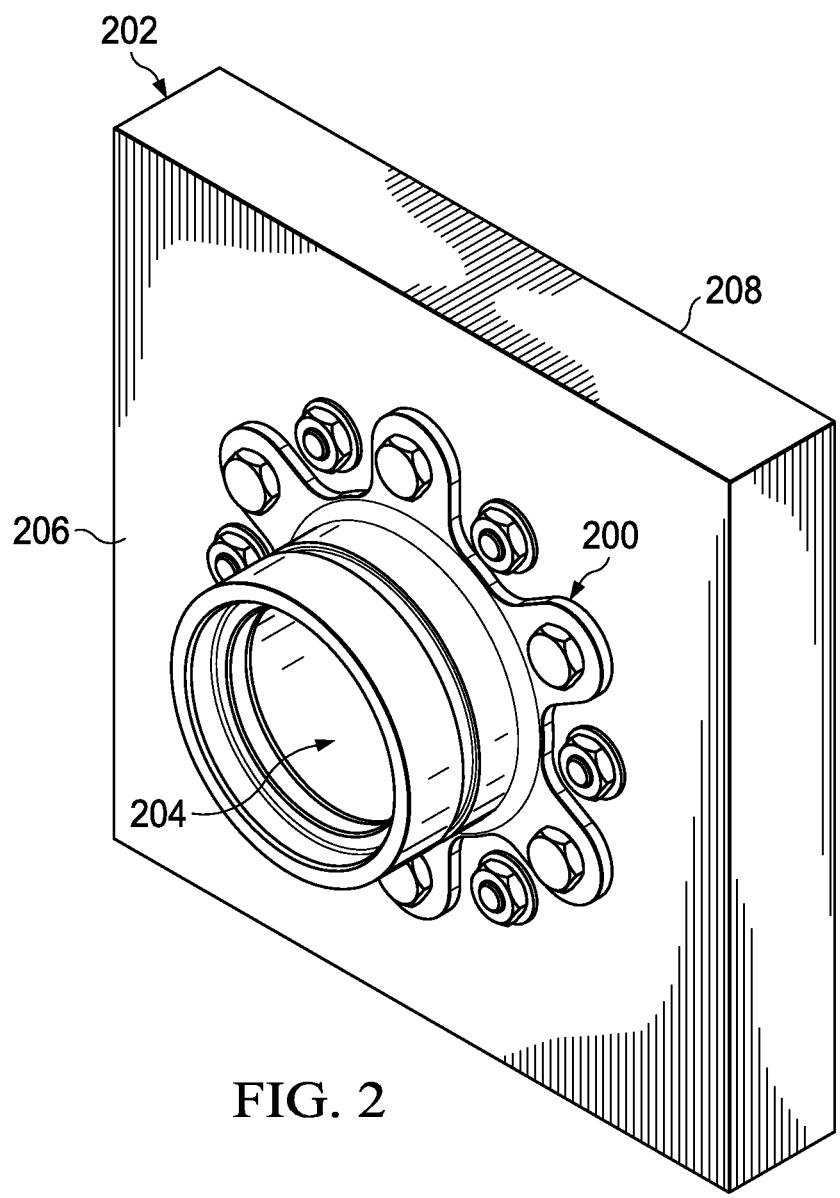
FIG. 2 is an illustration of an isometric view of a bulkhead fitting attached to a bulkhead in accordance with an illustrative embodiment.

With reference now to FIG. 2, an illustration of an isometric view of a bulkhead fitting attached to a bulkhead is depicted in accordance with an illustrative embodiment. As illustrated, bulkhead fitting 200 is attached to bulkhead 202. Bulkhead fitting 200 is an example of one implementation for fitting 100, namely bulkhead fitting 106, in FIG. 1. Further, bulkhead 202 is an example of one implementation for bulkhead 104 in FIG. 1.

As depicted, bulkhead fitting 200 forms channel 204. Channel 204 extends through bulkhead 202 from first side 206 of bulkhead 202 to second side 208 of bulkhead 202.

Figure 3:
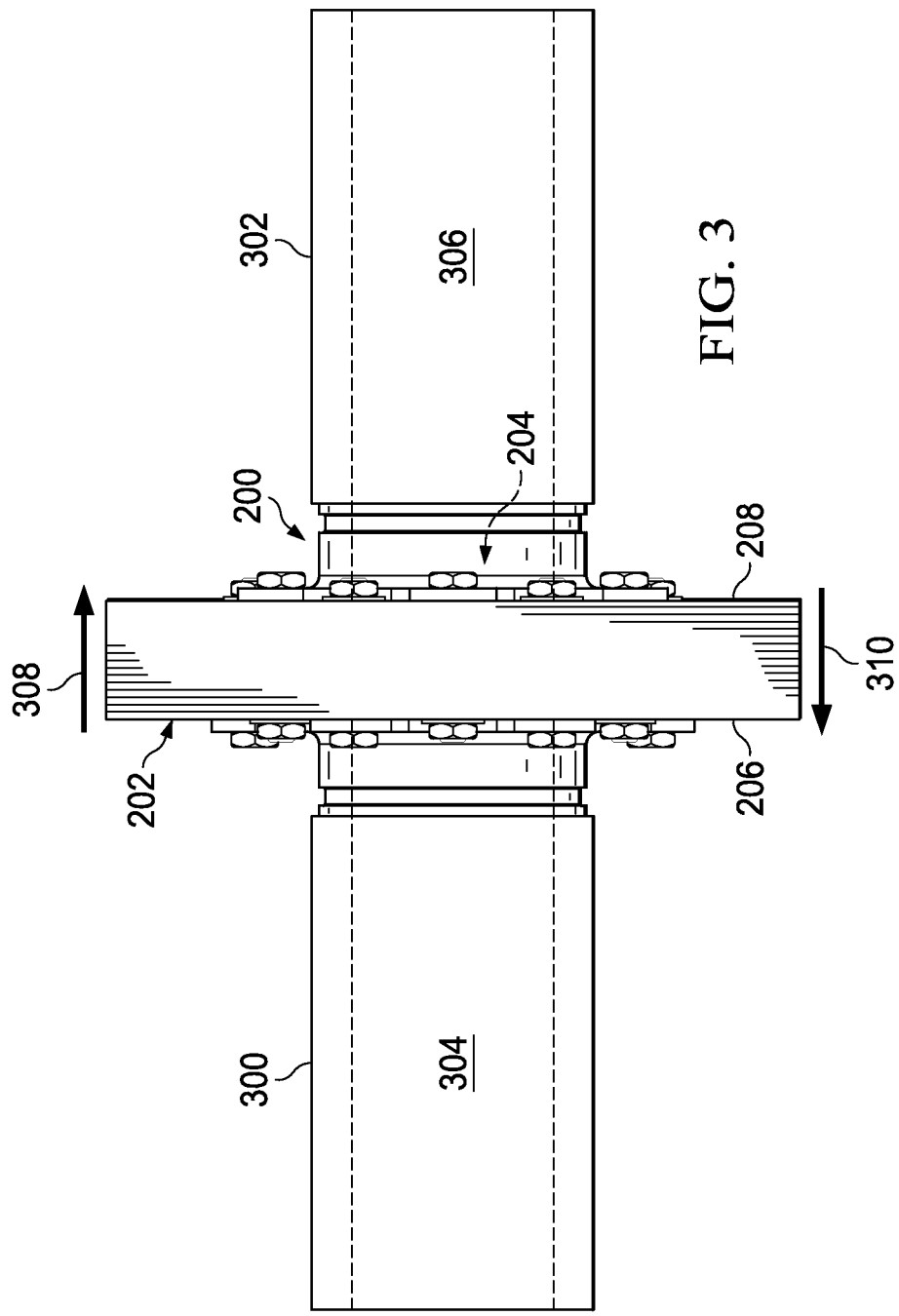
FIG. 3 is an illustration of a side view of a bulkhead fitting connecting two fluid lines across structure in accordance with an illustrative embodiment.

Turning now to FIG. 3, an illustration of a side view of bulkhead fitting 200 from FIG. 2 connecting two fluid lines across bulkhead 202 from FIG. 2 is depicted in accordance with an illustrative embodiment. In this illustrative example, bulkhead fitting 200 connects first fluid line 300 to second fluid line 302. First fluid line 300 and second fluid line 302 are examples of implementations for first fluid line 108 and second fluid line 110, respectively, in FIG. 1.

As depicted, first fluid line 300 has first channel 304 and second fluid line 302 has second channel 306. Channel 204 through bulkhead fitting 200 connects first channel 304 to second channel 306 such that fluid may flow between first channel 304 and second channel 306. The fluid may be, for example, without limitation, fuel, hydraulic fluid, or some other type of fluid. The fluid may be allowed to flow in the direction of arrow 308, in the direction of arrow 310, or in the directions of both arrow 308 and arrow 310 simultaneously.

Figure 4:
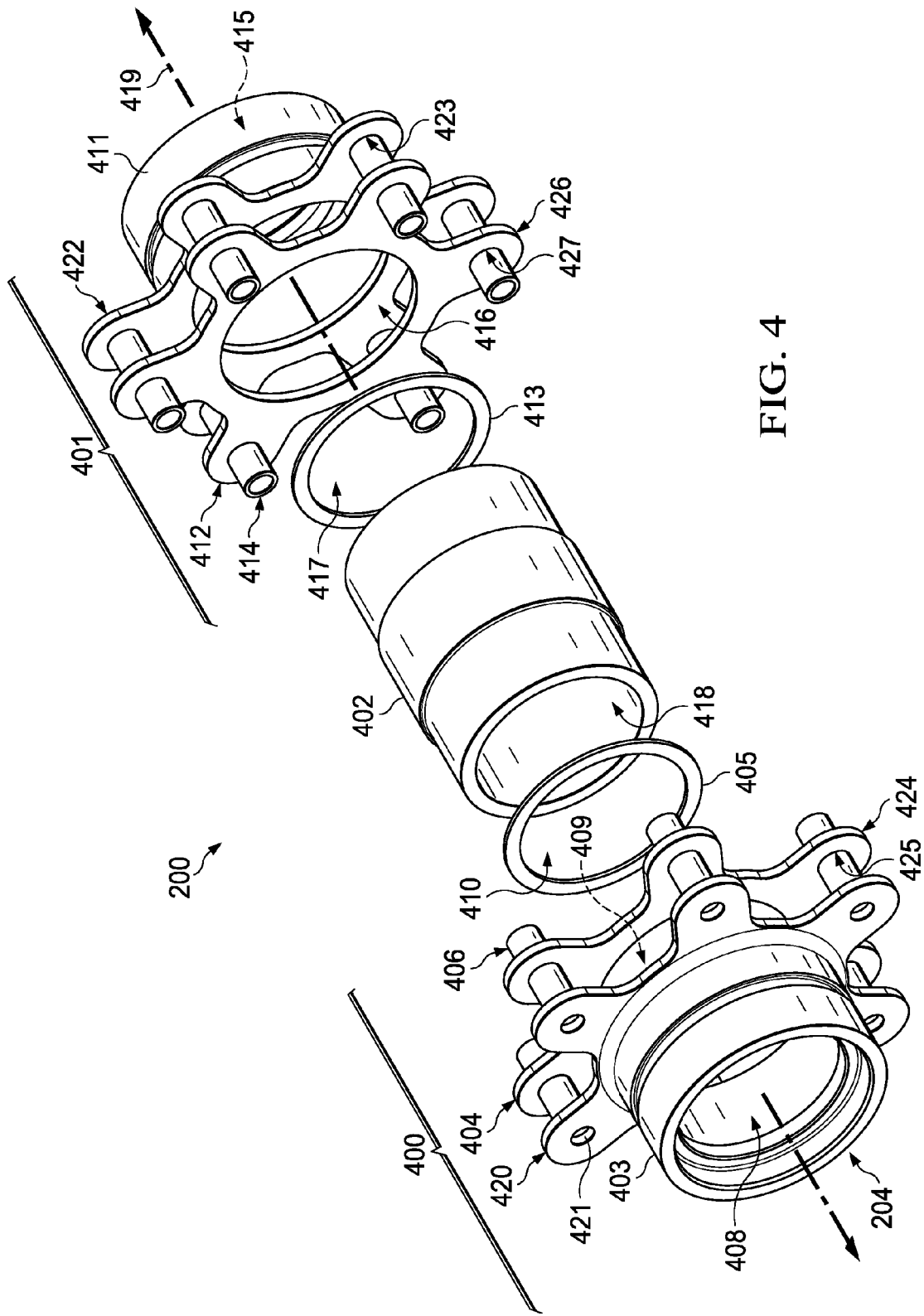
FIG. 4 is an illustration of an exploded isometric view of a bulkhead fitting in accordance with an illustrative embodiment.

With reference now to FIG. 4, an illustration of an exploded isometric view of bulkhead fitting 200 from FIGS. 2-3 is depicted in accordance with an illustrative embodiment. As depicted, bulkhead fitting 200 is comprised of first component 400, second component 401, and isolator 402. First component 400, second component 401, and isolator 402 are examples of implementations for first component 120, second component 122, and isolator 124, respectively in FIG. 1.

In this illustrative example, first component 400 comprises first attachment object 403, first gasket 404, first o-ring 405, and first plurality of sleeves 406. First attachment object 403, first gasket 404, and first o-ring 405 have opening 408, opening 409, and opening 410, respectively. Opening 408, opening 409, and opening 410 may form a first portion of channel 204.

Further, second component 401 comprises second attachment object 411, second gasket 412, second o-ring 413, and second plurality of sleeves 414. Second attachment object 411, second gasket 412, and second o-ring 413 have opening 415, opening 416, and opening 417, respectively. Opening 415, opening 416, and opening 417 may form a second portion of channel 204.

Isolator 402 has opening 418. Opening 418 may also be referred to as an isolator channel in some cases. In this illustrative example, opening 418 forms the final portion of channel 204. Isolator 402 has a length sufficient to provide electrical separation between first fluid line 300 and second fluid line 302 in FIG. 3.

As depicted, first component 400, second component 401, and isolator 402 may be substantially concentrically aligned with axis 419. In particular, first component 400 comprises first attachment object 403, first gasket 404, first o-ring 405, and second component 401 comprises second attachment object 411, second gasket 412, second o-ring 413, and isolator 402. All of these different components may be substantially concentrically aligned with axis 419.

In this illustrative example, first attachment object 403 has first flanges 420 with first openings 421. Second attachment object 411 has second flanges 422 with second openings 423. Further, first gasket 404 has first flanges 424 with first openings 425. First openings 425 in first flanges 424 of first gasket 404 may substantially align with first openings 421 in first flanges 420 of first attachment object 403. Further, second gasket 412 has second flanges 426 with second openings 427. Second openings 427 in second flanges 426 of second gasket 412 may substantially align with second openings 423 in second flanges 422 of second attachment object 411.

First plurality of sleeves 406 may be configured to pass through first openings 425 in first flanges 424 of first gasket 404 and be positioned at first openings 421 in first flanges 420 of first attachment object 403. First plurality of sleeves 406 may be positioned at first openings 421 to receive a first plurality of fastener elements (not shown in this view) inserted through first openings 421.

Similarly, second plurality of sleeves 414 may be configured to pass through second openings 427 in second flanges 426 of second gasket 412 and be positioned at second openings 423 in second flanges 422 of second attachment object 411. Second plurality of sleeves 414 may be positioned at second openings 423 to receive a second plurality of fastener elements (not shown in this view) inserted through second openings 423.

Figure 5:
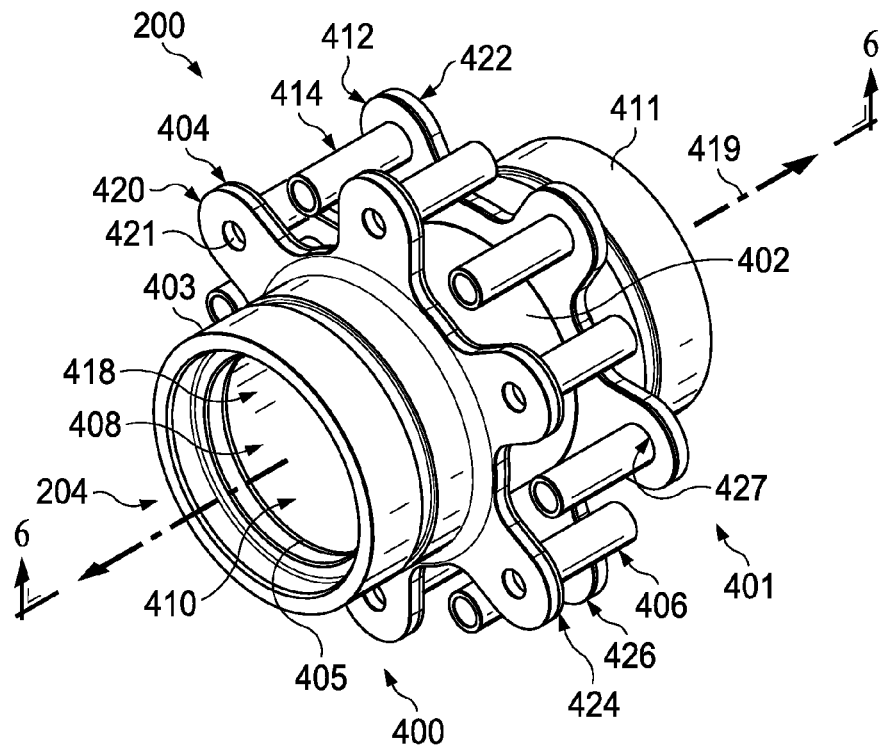
FIG. 5 is an illustration of an isometric view of a bulkhead fitting fully assembled in accordance with an illustrative embodiment.

With reference now to FIG. 5, an illustration of an isometric view of bulkhead fitting 200 from FIG. 2 fully assembled is depicted in accordance with an illustrative embodiment. In this illustrative example, first flanges 420 and first flanges 424 may not be aligned with second flanges 422 and second flanges 426, respectively.

However, first attachment object 403 and first gasket 404 are positioned such that first flanges 420 of first attachment object 403 and first flanges 424 of first gasket 404 are substantially aligned. Further, second attachment object 411 and second gasket 412 are positioned such that second flanges 422 of second attachment object 411 and second flanges 426 of second gasket 412 are substantially aligned.

Figure 6:
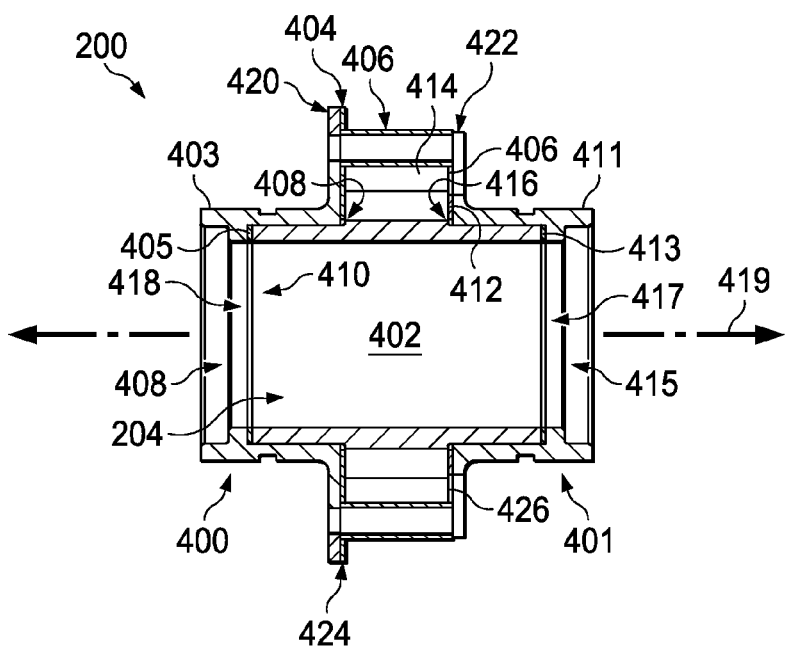
FIG. 6 is an illustration of a cross-sectional view of a bulkhead fitting in accordance with an illustrative embodiment.

Turning now to FIG. 6, an illustration of a cross-sectional view of bulkhead fitting 200 in FIG. 5 is depicted in accordance with an illustrative embodiment. In FIG. 5, a cross-sectional view of bulkhead fitting 200 is taken with respect to lines 6-6 in FIG. 5. As depicted in this example, first plurality of sleeves 406 may be sufficiently long to fully extend across the distance between first attachment object 403 and second gasket 412. Further, second plurality of sleeves 414 may be sufficiently long to fully extend across the distance between second attachment object 411 and first gasket 404.

Figure 7:
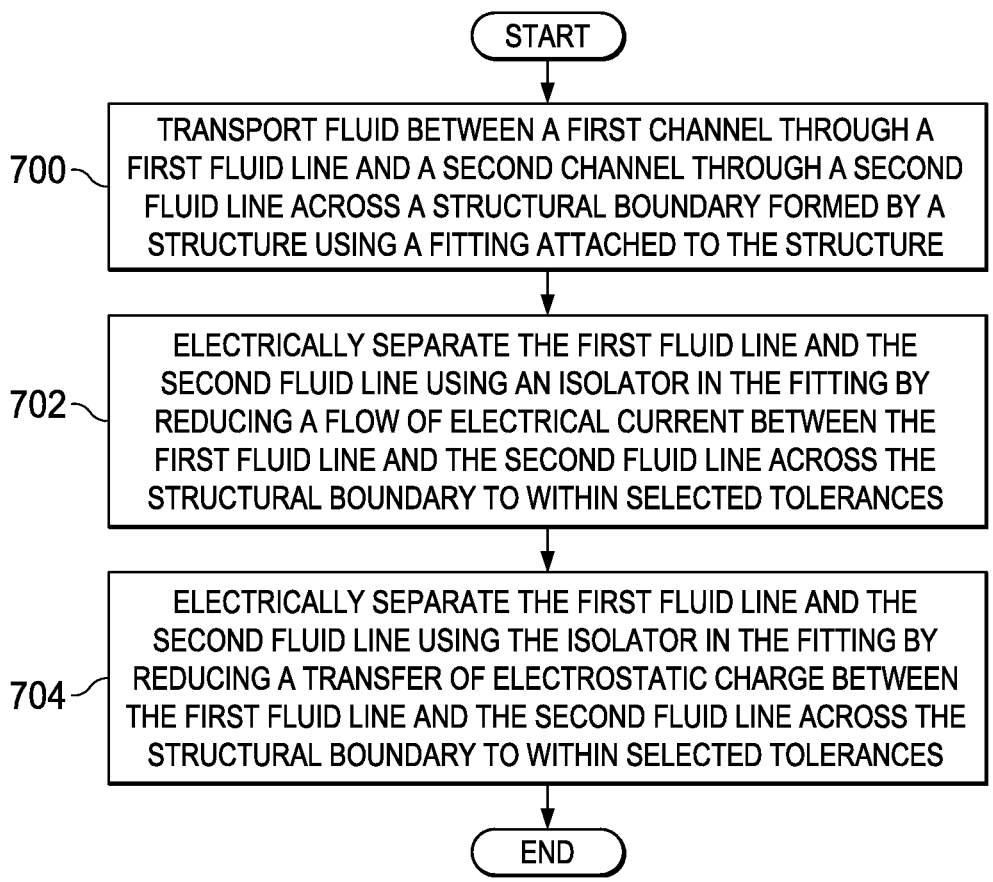
FIG. 7 is an illustration of a process for electrically separating two fluid lines across a structural boundary in the form of a flowchart in accordance with an illustrative embodiment.

With reference now to FIG. 7, an illustration of a process for electrically separating two fluid lines across a structural boundary is depicted in the form of a flowchart in accordance with an illustrative embodiment. The process illustrated in FIG. 7 may be implemented using fitting 100 in FIG. 1.

The process begins by transporting fluid between a first channel through a first fluid line and a second channel through a second fluid line across a structural boundary formed by a structure using a fitting attached to the structure (operation 700). The first channel and the second channel are connected by a channel formed by the fitting.

The fitting may be implemented in a manner similar to, for example, fitting 100 in FIG. 1. In one illustrative example, the fitting may take the form of a bulkhead fitting. The structure may be implemented in a manner similar to, for example, structure 102 in FIG. 1. In one illustrative example, the structure may take the form of a bulkhead.

Next, the first fluid line and the second fluid line are electrically separated using an isolator in the fitting by reducing a flow of electrical current between the first fluid line and the second fluid line across the structural boundary to within selected tolerances (operation 702). Additionally, the first fluid line and the second fluid line are electrically separated using the isolator in the fitting by reducing a transfer of electrostatic charge between the first fluid line and the second fluid line across the structural boundary to within selected tolerances (operation 704), with the process terminating thereafter.

In this manner, the illustrative examples described above in FIGS. 1-7 may be used to electrically separate fluid lines across structural boundaries. The bulkhead fitting described by these different illustrative examples may not increase the weight and/or number of parts needed for a fluid transport system, such as a fuel system, more than desired. Further, these types of bulkhead fittings may provide electrical separation using simpler means than using adhesive, sealants, and/or other types of materials.

Illustrative examples of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in the form of a flowchart in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft in the form of a block diagram is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. For example, one or more fittings implemented in a manner similar to fitting 100 in FIG. 1 and/or bulkhead fitting 200 in FIGS. 2-6 may be installed within aircraft 900 during any one of the stages of aircraft manufacturing and service method 800. In particular, these fittings may be installed within aircraft 900 during component and subassembly manufacturing 806, system integration 808, in service 812, routine maintenance and service 814, and/or other stages.

In one illustrative example, components or subassemblies produced in component and subassembly manufacturing 806 in FIG. 8 may be fabricated or manufactured in a manner similar to components or subassemblies produced while aircraft 900 is in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812 and/or during maintenance and service 814 in FIG. 8. The use of a number of the different illustrative embodiments may substantially expedite the assembly of and/or reduce the cost of aircraft 900.

The flowcharts and block diagrams depicted in the different figures illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
  a first component attached to a first fluid line and a first side of a structure;
  a second component attached to a second fluid line and a second side of the structure; and
  an isolator located between the first component and the second component within an opening in the structure,
  wherein the first component, the second component, and the isolator form a channel that connects a first channel through the first fluid line to a second channel in the second fluid line; and
  wherein the isolator electrically separates the first fluid line and the second fluid line.

2. The apparatus of claim 1, wherein the isolator electrically separates the first fluid line and the second fluid line by reducing a flow of electrical current between the first fluid line and the second fluid line to within selected tolerances.

3. The apparatus of claim 1, wherein the isolator electrically separates the first fluid line and the second fluid line by reducing a transfer of electrostatic charge between the first fluid line and the second fluid line to within selected tolerances.

4. The apparatus of claim 1, wherein the first component comprises a first attachment object that attaches to the first fluid line and the first side of the structure and the second component comprises a second attachment object that attaches to the second fluid line and the second side of the structure.

5. The apparatus of claim 4, wherein the first component comprises a first number of seals configured to seal a first interface between the first attachment object and the isolator and the second component comprises a second number of seals configured to seal a second interface between the second attachment object and the isolator.

6. The apparatus of claim 5, wherein the first number of seals includes a first gasket and a first o-ring and the second number of seals includes a second gasket and a second o-ring.

7. The apparatus of claim 4, wherein the first component comprises a first plurality of sleeves extending substantially through the structure and the second component comprises a second plurality of sleeves extending substantially through the structure, wherein the first plurality of sleeves is not aligned with the second plurality of sleeves.

8. The apparatus of claim 7, wherein the first attachment object has first flanges with first openings configured for association with the first plurality of sleeves and wherein the second attachment object has second flanges with second openings configured for association with the second plurality of sleeves.

9. The apparatus of claim 8 further comprising:
  a first plurality of fastener elements inserted through the first openings of the first attachment object into the first plurality of sleeves to attach the first attachment object to the first side of the structure; and
  a second plurality of fastener elements inserted through the second openings of the second attachment object into the second plurality of sleeves to attach the second attachment object to the second side of the structure.

10. The apparatus of claim 1, wherein the isolator is comprised of a material having a number of electrical properties within a selected range.

11. The apparatus of claim 10, wherein the number of electrical properties includes at least one of an electrical resistance, an electrical conductivity, and an electrical resistivity.

12. The apparatus of claim 1, wherein the isolator has a length sufficient to electrically separate the first fluid line and the second fluid line.

13. The apparatus of claim 1, wherein the structure is a bulkhead and wherein the first component, the second component, and the isolator form a bulkhead fitting.

14. The apparatus of claim 13, wherein the bulkhead is located in one of an aerial platform, a space platform, and an aerospace platform.

15. The apparatus of claim 1, wherein the first fluid line is a first fuel line and the second fluid line is a second fuel line.

16. A bulkhead fitting comprising:
  a first component attached to a first fluid line and a first side of a bulkhead;
  a second component attached to a second fluid line and a second side of the bulkhead; and
  an isolator located between the first component and the second component within an opening in the bulkhead,
  wherein the first component, the second component, and the isolator form a channel that connects a first channel through the first fluid line to a second channel in the second fluid line; and
  wherein the isolator electrically separates the first fluid line and the second fluid line by at least one of reducing a flow of electrical current between the first fluid line and the second fluid line to within selected tolerances and reducing a transfer of electrostatic charge between the first fluid line and the second fluid line to within selected tolerances.

17. The bulkhead fitting of claim 16, wherein the bulkhead is located within one of an aerial platform, a space platform, and an aerospace platform.

* * * * *